United States Patent [19]

Grzesiak

[11] Patent Number: 5,078,237
[45] Date of Patent: Jan. 7, 1992

[54] AUTOMATIC TRANSMISSION BANDS

[75] Inventor: Anthony J. Grzesiak, Sauk Village, Ill.

[73] Assignee: Borg-Warner Automotive Transmission & Engine Components Corporation, Sterling Heights, Mich.

[21] Appl. No.: 546,161

[22] Filed: Jun. 28, 1990

[51] Int. Cl.⁵ .............................................. F16D 65/06
[52] U.S. Cl. ............................ 188/250 H; 29/432.2; 29/509; 72/372; 192/107 T; 403/283; 403/285
[58] Field of Search ............... 188/249, 250 B, 250 F, 188/250 H, 77, 259; 192/80, 107 T; 29/432.1, 432.2, 509; 403/283, 285; 72/372

[56] References Cited

U.S. PATENT DOCUMENTS

| | | | |
|---|---|---|---|
| 1,590,104 | 6/1926 | Manning | 188/249 |
| 1,720,765 | 7/1929 | Smith | 188/259 |
| 2,139,590 | 12/1938 | Jessop | 29/509 R |
| 3,015,682 | 1/1962 | Cheske | 29/509 X |
| 3,367,466 | 2/1968 | Lang | 188/259 X |
| 3,399,749 | 9/1968 | Baule | 188/259 |
| 3,732,954 | 5/1973 | Heid | 188/259 |
| 3,811,542 | 5/1974 | Hamrick | 188/250 H X |
| 4,157,746 | 6/1979 | Body | 188/77 R |
| 4,159,049 | 6/1979 | Merz | 188/259 X |
| 4,456,100 | 6/1984 | Manaki | 188/77 R |
| 4,585,098 | 4/1986 | Pike | 188/249 X |
| 4,602,706 | 7/1986 | Blinks et al. | 188/259 |
| 4,611,381 | 9/1986 | LaBarge et al. | 29/509 X |
| 4,757,880 | 7/1988 | Grzesiak | 188/77 W |
| 4,787,483 | 11/1988 | Stefanutti | 188/249 X |

FOREIGN PATENT DOCUMENTS

| 1248884 | 1/1989 | Canada | 188/174 |
|---|---|---|---|
| 2340446 | 2/1974 | Fed. Rep. of Germany | 188/250 F |

Primary Examiner—George E. A. Halvosa
Attorney, Agent, or Firm—James A. Geppert

[57] ABSTRACT

A one-piece transmission brake band and the method of forming the same wherein the band is an elongated strap with brackets at the opposite ends thereof, the brackets providing an apply end and a reaction end. Each end consists of an end portion of the strap that is folded over upon itself onto the exterior surface of the band and suitably fastened thereto, such as by clinch fastening or spot welding. The apply end of the band has the outer layer provided with a transverse upwardly folded or crimped ridge having a central depression to receive the end of an apply piston, and the reaction end has an outwardly extending radial opening formed by piercing through both layers of material after the end is folded over, with the layers being outwardly extruded in both the radial and circumferential directions. An alternative embodiment utilizes an insert having a cylindrical body with a circumferential base flange. An opening is stamped in the outer layer of material with a raised rim therearound; the opening receiving the cylindrical body and the raised rim receiving the base flange.

8 Claims, 2 Drawing Sheets

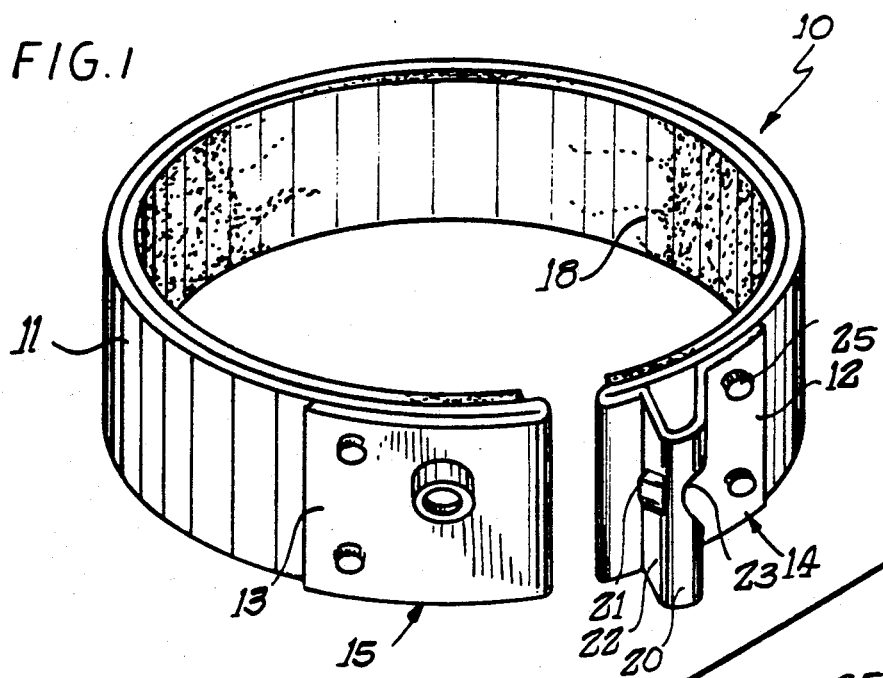
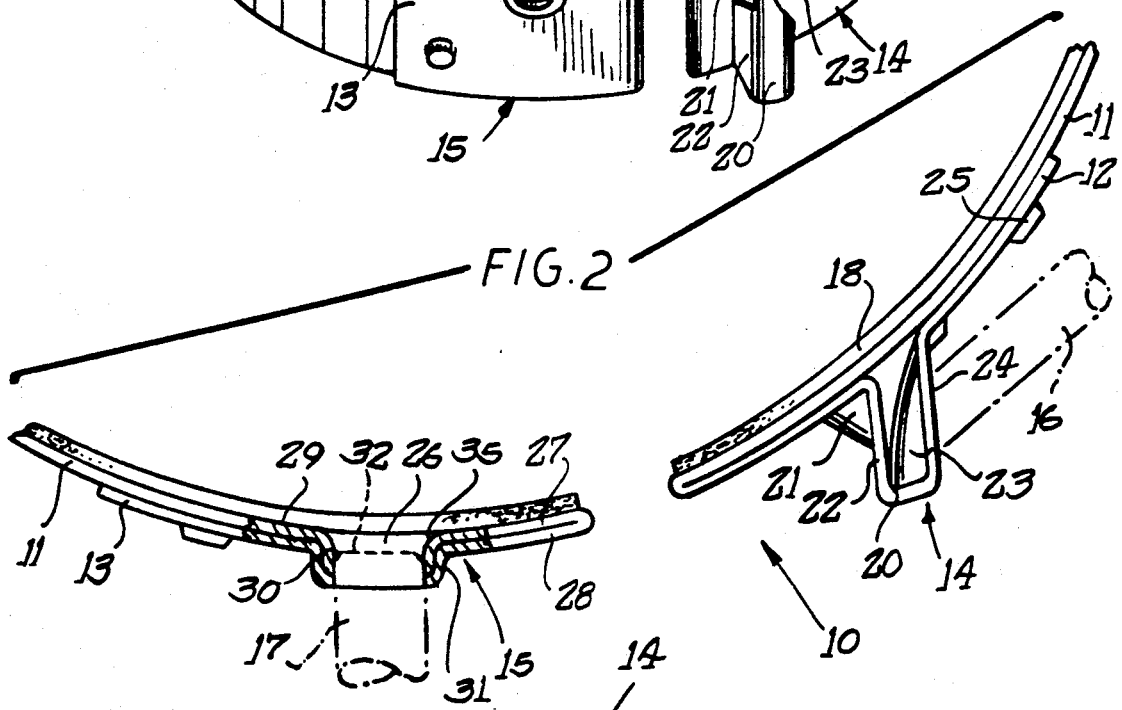
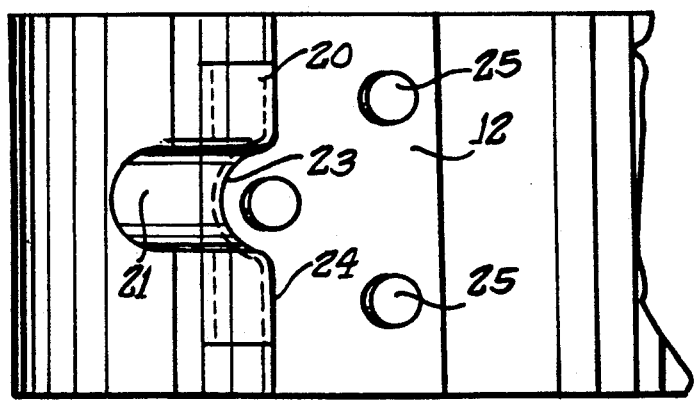

AUTOMATIC TRANSMISSION BANDS

TECHNICAL FIELD

The invention disclosed herein relates to transmission brake bands utilized in vehicle automatic transmissions wherein the bands encompass one or more clutch drums and, under the influence of suitable hydraulic controls, effect gear changes and/or control the direction of rotation of the output or drive shaft from the transmission.

BACKGROUND

In conventional vehicle automatic transmissions of the torque converter type, a driving shaft extends from the torque converter into the transmission housing to a unit therein having one or more clutch drums around which are arranged either single-wrap or double wrap brake bands. Depending on torque requirements, one-piece bands can be utilized in low load/torque coast band or overdrive situations. It is the function of the brake bands under suitable hydraulic controls to effect gear change and control of the direction of rotation of the output or driven shaft from the transmission to the differential for the driving wheels of the vehicle.

Presently manufactured brake bands of the single-wrap type are formed from a strip of sheet steel or similar material and the ends are formed from separate relatively thick forgings, castings or stampings which are suitably secured to the strap of material by spot welding or similar means. Each brake band has an actuation or apply end for an apply piston and a reaction end which is operatively connected to a reaction member in the transmission. Various types of automatic transmissions utilize different types of reaction members. Some reaction members may be of the tangential type which have a stationary plunger or stop member acting against an anchor end of the brake band, while others may be of the reaction pin type where the pin extends perpendicular to the clutch drum and strap and extends into a suitable opening in the anchor bracket for the band.

Where a reaction pin is used to form a reaction member in the transmission, a "volcano" type reaction bracket is often provided which consists of an extruded opening extending radially outwardly from the reaction bracket of the band or a bushing that is secured to the bracket at an opening therein to receive the free end of the reaction pin providing the stationary end of the brake band during use of the band in the automatic transmission. The opposite or apply end of the band is provided with an apply bracket which cooperates with the end of an apply plunger in the transmission that is hydraulically controlled to urge the band ends together to tighten around the clutch drum and stop the rotation of the drum or otherwise alter the rotation of the drum or other member to change the gear ratio or alter the direction of rotation of the output shaft.

Due to assembly tolerances in the transmission assembly and/or testing facilities, the reaction brackets can be subjected to high stress which may result in premature failure during testing or operation of the transmission. To overcome the possibility of any premature failures of the bands or brackets associated therewith, the present invention relates to a novel method of manufacture of the brake band and the brackets therefor such that the strength of the bracket is increased and stress reduced so that failure of the bracket will be lessened and possible rejection of the bands overcome.

DISCLOSURE OF THE INVENTION

The present invention relates to a new and novel method of manufacture of automatic transmission brake bands and to the brake bands resulting therefrom. Rather than forming a separate reaction bracket and punching or piercing the "volcano" type reaction opening in the bracket, the present invention uses a single piece brake band having an anchor embossment extruded from double thicknesses of the base metal to produce the "volcano" type reaction bracket at one end of the brake band.

In forming the band a single strip of suitable metallic material is provided and both ends of the strip are bent upwardly and rearwardly over upon itself to form double thicknesses or layers of material to form the apply and reaction brackets at the ends of the strap. Once the material has been folded upon itself, the "volcano" type opening to receive the reaction pin of the transmission is formed by piercing the layers to extrude the layers to form a tapered opening that is more stress resistant. Simultaneously, the two layers of material are secured together by clinch fastening or spot welding. Similarly, a double layer of material forming the apply bracket is provided with an apply ridge by folding the outer layer of material outwardly to provide an apply surface for the end of an apply piston to engage and act to tighten the band around the clutch drum to apply the transmission band to the drum.

BRIEF DESCRIPTION OF THE DRAWINGS

FIG. 1 is a perspective view of the transmission brake band of the present invention to be applied to a clutch drum.

FIG. 2 is a partial end elevational view of the brake band with portions in cross section showing the apply and reaction brackets formed at the outer ends.

FIG. 3 is a top plan view of the apply bracket for a single-wrap transmission band.

BEST MODES OF CARRYING OUT THE INVENTION

Figure 4:
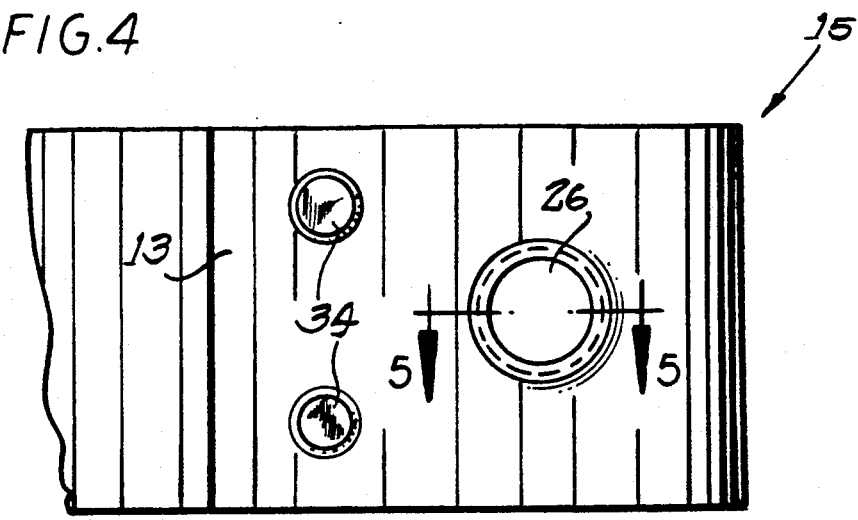
FIG. 4 is a top plan view of the reaction bracket of the present invention.

Referring more particularly to the disclosure in the drawings wherein are shown illustrative embodiments of the present invention, FIG. 1 discloses a one-piece brake band 10 for use in a vehicle automatic transmission (not shown) which is formed from an elongated strip of material to form a curved strap of a determinate length. The opposite ends 12 and 13 of the strap 11 are folded back upon themselves to provide brackets 14 and 15 for an apply piston 16 and a reaction pin 17, respectively. The brake band 10 includes a friction lining 18 suitably secured thereto, such as by a suitable adhesive, and the strip is formed into a curved strap such as shown in FIG. 1.

The improvement of the present invention resides in the bracket ends 14 and 15 of the brake band 10. As seen in FIGS. 2 and 3, the apply end 14 is formed by folding the end 12 upwardly and backwardly upon itself, the end being provided with an upwardly folded ridge 20 which has a strengthening rib 21 on the back side 22 of the fold located below the contact point for a piston or pin on the bracket and a depressed area forming a pocket 23 in the central area on the opposite side 24 of the fold adapted to receive the free end of the apply piston 16 acting in a generally tangential direction to the clutch drum. The folded end portion 12 is secured to the strap simultaneously with the folding and forming operation by several clinched fasteners 25.

Figure 5:
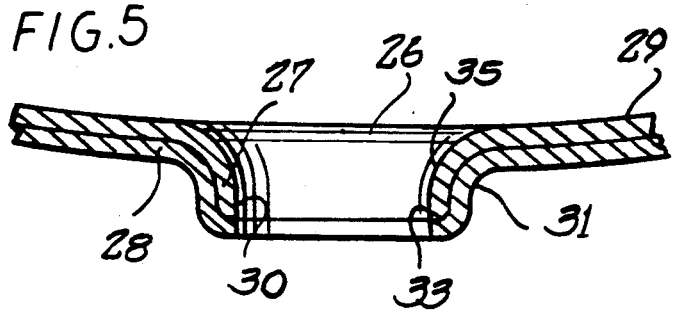
FIG. 5 is an enlarged cross sectional view taken on the line 5—5 of FIG. 4 of a portion of the reaction bracket for the brake band showing the extrusion of the two layers of metal to form the reaction opening.

Referring now to FIGS. 2, 4 and 5 with respect to the anchor or reaction bracket 15, the end 13 is folded upwardly and rearwardly upon itself and a reaction pin opening 26 is formed in both layers 27, 28 of the strap by piercing both layers from the interior strap surface 29 with a suitable tool to form an extruded opening with an inner slightly tapered surface 30 and an outer tapered surface 31. The inner layer of material 27 is urged upwardly and outwardly to form the inner tapered surface 30 of the extruded opening. As more clearly seen in FIG. 5, the inner layer of material 27 terminates short of the outer layer at 33 in the opening 26. Referring now to FIGS. 2 and 4, the end 13 is fastened to the strap by clinched fasteners 34 similar to the fastener 25 in the apply bracket 14. Although clinched fasteners are shown, the layers 27, 28 could also be spot welded together if desired. Referring now to FIG. 2, the reaction pin 17 may be provided with a tapered end 32 that is received in the opening 26 of the anchor bracket 15. The reaction pin 17 is received in the opening 26 to desired depth 35 to prevent generation of excessive stress within the opening 26.

Figure 6:
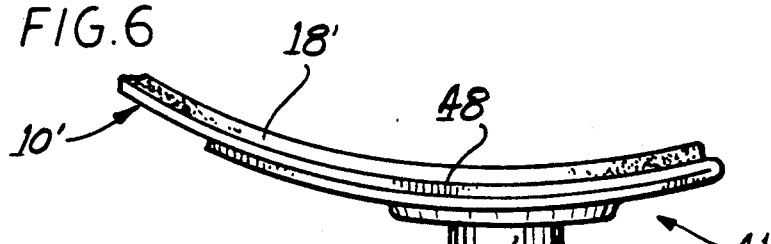
FIG. 6 is a partial elevational view of an alternate form of reaction bracket utilizing an insert forming the reaction pin opening.
Figure 7:
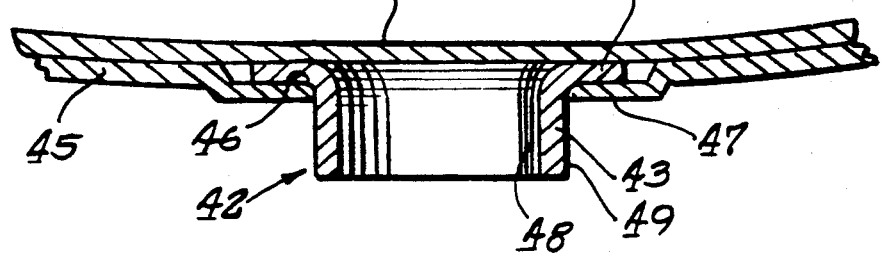
FIG. 7 is an enlarged partial cross sectional view of the alternate reaction bracket similar to FIG. 5.

FIGS. 6 and 7 disclose an alternate embodiment of the reaction bracket 41 for the one-piece brake band 10'. In this embodiment of the brake band, a separate insert 42 is formed with a generally cylindrical body 43 having a flange 44 integral with the body 43 to provide a base for the insert; the insert body being received into an opening 46 formed in the folded over layer 45 of the strap with a circular raised rim 47 encompassing the opening 46 to receive the base positioning flange 44. In this embodiment, the inner layer 48 of the strap does not have an opening formed therein. The insert has an inner tapered surface 48 and an outer tapered surface 49 for the "volcano" opening to receive the reaction pin (not shown) for the transmission. In both embodiments, the stresses are lower and the strength increased for the apply and reaction brackets compared to the brackets presently in use.

INDUSTRIAL APPLICABILITY

The invention described herein is readily applicable to automatic transmissions for use in automotive vehicles.

I Claim:

1. A one-piece transmission brake band for use in automatic transmissions for automotive vehicles wherein the band is formed from a single curved strap of elongated material having an apply bracket at one end and a reaction bracket at the opposite end with a friction lining suitably secured onto an interior surface of the strap, the improvement comprising said reaction bracket being formed by folding an end of the strap backward and over onto an exterior surface of itself to form two layers of material, said reaction bracket including an extruded reaction opening formed from the two layers of material by piercing and extruding through both layers of material, said opening having an outwardly inner tapered surface and an outer tapered surface.

2. A one-piece transmission brake band as set forth in claim 1, in which the opening in the reaction bracket receives a reaction pin positioned in the transmission perpendicular to the reaction bracket.

3. A one-piece transmission brake band as set forth in claim 1, in which the piercing of the layers of material acts to extrude the material both radially and circumferentially outwardly to urge the material layers together.

4. A one-piece transmission brake band as set forth in claim 1, in which the folded-over outer-layer of material is fastened to the inner layer of the strap by clinch fastening in the same process step as the reaction opening being extruded through the layers.

5. A method of forming a one-piece transmission brake band from an elongated strip of material wherein the strip of material forms a friction-lined strap with a pair of brackets at the opposite ends of the strap, comprising the steps of: bending the ends of the strap over onto an outer surface of the strap to form at least two metal layers, forming an apply bracket, forming a reaction bracket to receive a reaction pin by piercing both layers of material and extruding the layers generally radially outwardly perpendicular to the strap, securing a friction lining onto the strap, and forming the strap into a curved band.

6. The method of forming a transmission brake band as set forth in claim 5, in which the inner and outer layers of the strap are clinch fastened simultaneously with the piercing of the reaction pin opening.

7. The method of forming a transmission brake band as set forth in claim 5, wherein the piercing operation forms the opening with an internal outward taper to assist in locating said reaction pin.

8. The method of forming a transmission brake band as set forth in claim 7, wherein the extruded layers forming the opening have an external taper.

* * * * *